(12) United States Patent
Saji

(10) Patent No.: US 9,041,485 B2
(45) Date of Patent: May 26, 2015

(54) HIGH FREQUENCY ELECTRONIC COMPONENT

(75) Inventor: Tetsuo Saji, Kanagawa (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 307 days.

(21) Appl. No.: 13/599,667

(22) Filed: Aug. 30, 2012

(65) Prior Publication Data

US 2013/0063224 A1    Mar. 14, 2013

(30) Foreign Application Priority Data

Sep. 9, 2011   (JP) .................................. 2011-197389

(51) Int. Cl.
*H03H 7/46*    (2006.01)

(52) U.S. Cl.
CPC ...................................... *H04B 1/525* (2013.01)

(58) Field of Classification Search
CPC ........ H03H 7/46; H03H 7/463; H03H 7/0115; H04B 1/525
USPC .......................................... 333/126, 129, 132
See application file for complete search history.

(56) References Cited

U.S. PATENT DOCUMENTS

| | | |
|---|---|---|
| 2002/0032012 A1 | 3/2002 | Ishii |
| 2004/0087334 A1 * | 5/2004 | Nishiyama .................. 455/550.1 |
| 2005/0020297 A1 | 1/2005 | Axness et al. |
| 2006/0165022 A1 | 7/2006 | Nast et al. |
| 2008/0279122 A1 | 11/2008 | Fukuda et al. |
| 2010/0026419 A1 | 2/2010 | Hara et al. |
| 2010/0197231 A1 | 8/2010 | Kenington |

FOREIGN PATENT DOCUMENTS

| | | |
|---|---|---|
| CN | 1901437 A | 1/2007 |
| CN | 201252148 Y | 6/2009 |
| GB | 1308353 A * | 2/1973 |
| JP | 10-303777 A | 11/1998 |
| JP | 2002-076953 A | 3/2002 |
| JP | 2006-520143 A | 8/2006 |

(Continued)

OTHER PUBLICATIONS

Chinese Office Action dated May 23, 2014, in a counterpart Chinese patent application No. 201210329950.X.

(Continued)

*Primary Examiner* — Robert Pascal
*Assistant Examiner* — Kimberly Glenn
(74) *Attorney, Agent, or Firm* — Chen Yoshimura LLP

(57) ABSTRACT

An electronic component includes: a first circuit connected to a first common terminal for inputting/outputting a first signal set, a second common terminal for inputting/outputting a second signal set having a frequency higher than the first signal set, and a third common terminal for being connected to an antenna; and a second circuit connected in parallel to the first circuit between the first and second common terminals, wherein the first circuit includes a first filter transmitting the first signal set and reflecting the second signal set, and a second filter transmitting the second signal set and reflecting the first signal set, the third common terminal is located between the first and second filters, and the second circuit reflects a first transmission signal and a second transmission signal, transmits parts of the first and second transmission signals, and inverts phases of the parts of the first and second transmission signals.

12 Claims, 14 Drawing Sheets

(56) References Cited

FOREIGN PATENT DOCUMENTS

| | | |
|---|---|---|
| JP | 2007-505591 A | 3/2007 |
| JP | 2008-278417 A | 11/2008 |
| JP | 2010-41141 A | 2/2010 |
| KR | 100649478 B1 | 11/2006 |
| KR | 10-2008-0099164 A | 11/2008 |
| KR | 10-2009-0030449 A | 3/2009 |
| WO | 2004/114683 A2 | 12/2004 |

OTHER PUBLICATIONS

Korean Office Action dated Feb. 24, 2014, in a counterpart Korean patent application No. 10-2012-0093470.

Japanese Office Action dated Mar. 17, 2015, in a counterpart Japanese patent application No. 2011-197389.

Chinese Office Action dated Feb. 28, 2015, in a counterpart Chinese patent application No. 201210329950.X.

* cited by examiner

HIGH FREQUENCY ELECTRONIC COMPONENT

CROSS-REFERENCE TO RELATED APPLICATION

This application is based upon and claims the benefit of priority of the prior Japanese Patent Application No. 2011-197389, filed on Sep. 9, 2011, the entire contents of which are incorporated herein by reference.

FIELD

A certain aspect of the present invention relates to an electronic component.

BACKGROUND

In recent years, there is a case where data such as video are transmitted together with voice sounds by communication devices such as mobile phones. To handle such purpose, it is required that a single communication device supports different communication methods. In order to achieve communication devices having multiple bands, there is a case where a plurality of high frequency devices such as duplexers and amplifiers supporting a high-frequency signal are mounted to a single mobile phone terminal. Japanese Patent Application Publication No. 2010-41141 discloses a technique in which a reception filter and a transmission filter share an antenna.

In small-size communication devices having multiple bands, it becomes difficult to ensure good isolation characteristics between a plurality of circuits. When at least two transmitting/receiving circuits perform the transmission simultaneously in a state in which isolation characteristics are insufficient, there is a case where the intermodulation distortion occurs. The intermodulation distortion may cause the degradation of the receiving sensitivity and the like.

SUMMARY OF THE INVENTION

According to an aspect of the present invention, there is provided an electronic component including: a first circuit that is connected to a first common terminal for inputting and outputting a first signal set including a first transmission signal and a first reception signal having mutually different frequencies, a second common terminal for inputting and outputting a second signal set having a frequency higher than the first signal set and including a second transmission signal and a second reception signal having mutually different frequencies, and a third common terminal for being connected to an antenna; and a second circuit that is connected in parallel to the first circuit between the first common terminal and the second common terminal, wherein the first circuit includes a first filter that transmits the first signal set and reflects the second signal set, and a second filter that transmits the second signal set and reflects the first signal set, the first filter being connected between the first common terminal and the second filter, the second filter being connected between the first filter and the second common terminal, and the third common terminal being located between the first filter and the second filter, and the second circuit reflects the first transmission signal and the second transmission signal, transmits a part of the first transmission signal and a part of the second transmission signal, and inverts a phase of the part of the first transmission signal and a phase of the part of the second transmission signal.

DETAILED DESCRIPTION

Figure 1:
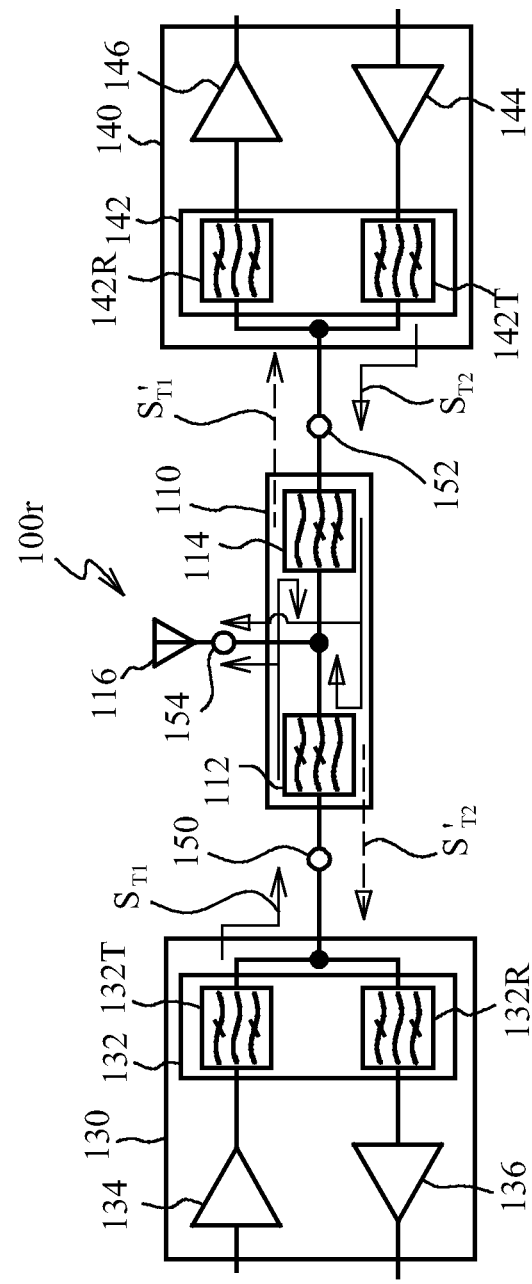
FIG. 1 is a diagram illustrating an electronic component in accordance with a comparative example.

A description will now be given of a comparative example. An electronic component described hereinafter is for transmitting and receiving signals, and is incorporated in communication devices such as mobile phones. FIG. 1 is a diagram illustrating an electronic component in accordance with the comparative example. Arrows in FIG. 1 represent a first transmission signal $S_{T1}$ (hereinafter, described as $S_{T1}$). Outlined arrows represent a second transmission signal $S_{T2}$ (hereinafter, described as $S_{T2}$). An arrow illustrated with a dashed line represents a signal leaking from the first transmission signal $S_{T1}$ (hereinafter, described as $S_{T1}'$). An outlined arrow illustrated with a dashed line represents a signal leaking from the second transmission signal $S_{T2}$ (hereinafter, described as $S_{T2}'$).

As illustrated in FIG. 1, an electronic component 100r in accordance with the comparative example includes a first circuit 110, a first front end 130, and a second front end 140. The first circuit 110 and the first front end 130 are connected via a first common terminal 150. The first circuit 110 and the second front end 140 are connected via a second common terminal 152. The first circuit 110 and an antenna 116 are connected via a third common terminal 154. The first front end 130 and a baseband circuit (not illustrated) form a first transmitting/receiving circuit. The second front end 140 and the baseband circuit form a second transmitting/receiving circuit. The baseband circuit performs demodulation of reception signals and modulation of transmission signals.

The first circuit 110 functions as a diplexer. The first circuit 110 includes a low-pass filter (hereinafter, abbreviated as LPF) 112 and a high-pass filter (hereinafter, abbreviated as HPF) 114. The LPF 112 and the HPF 114 are connected in series between the first common terminal 150 and the second common terminal 152. One end of the LPF 112 is connected to the first common terminal 150. The other end of the LPF 112 is connected to one end of the HPF 114. The other end of the HPF 114 is connected to the second common terminal 152. The third common terminal 154 is located between the other end of the LPF 112 and the one end of the HPF 114.

The first common terminal 150 is for inputting and outputting a first signal set between the first circuit 110 and the first front end 130. The first signal set includes the $S_{T1}$ and a first reception signal $S_{R1}$ (hereinafter, described as $S_{R1}$, and not illustrated) having mutually different frequencies. The second common terminal 152 is for inputting and outputting a second signal set between the first circuit 110 and the second front end 140. The second signal set includes the $S_{T2}$ and a second reception signal $S_{R2}$ (hereinafter, described as $S_{R2}$, and not illustrated) having mutually different frequencies. The transmission and reception of signals is described later.

As illustrated in FIG. 1, the first front end 130 includes a first duplexer 132, a power amplifier (hereinafter, abbreviated as PA) 134, and a low noise amplifier (hereinafter, abbreviated as LNA) 136. The first duplexer 132 includes a transmission filter 132T and a reception filter 132R. The transmission filter 132T and the reception filter 132R are bandpass filters (hereinafter, abbreviated as BPF), and are composed of a Surface Acoustic Wave (SAW) filter, a boundary acoustic wave filter, an FBAR (Film Bulk Acoustic Resonator) or the like. The impedance of the transmission filter becomes high at frequencies within the passband of the reception filter 132R. The impedance of the reception filter 132R becomes high at frequencies within the passband of the transmission filter 132T. The transmission filter 132T transmits and outputs signals of which frequencies are within the passband and that are included in signals that have been input from the output terminal of the PA 134 to the first common terminal 150, and suppresses signals of which frequencies are outside the passband. A signal output to the first common terminal 150 is the $S_{T1}$. The reception filter 132R transmits and outputs signals of which frequencies are within the passband and that are included in signals that have been input from the first common terminal 150 to the input terminal of the LNA 136, and suppresses signals of which frequencies are outside the passband.

The second front end 140 includes a second duplexer 142, a PA 144 and an LNA 146. The second duplexer 142 includes a transmission filter 142T and a reception filter 142R. As with the transmission filter 132T of the first front end 130, the transmission filter 142T outputs the $S_{T2}$ to the second common terminal 152. As with the reception filter 132R, the reception filter 142R outputs a signal to the input terminal of the LNA 146.

Figure 2A:
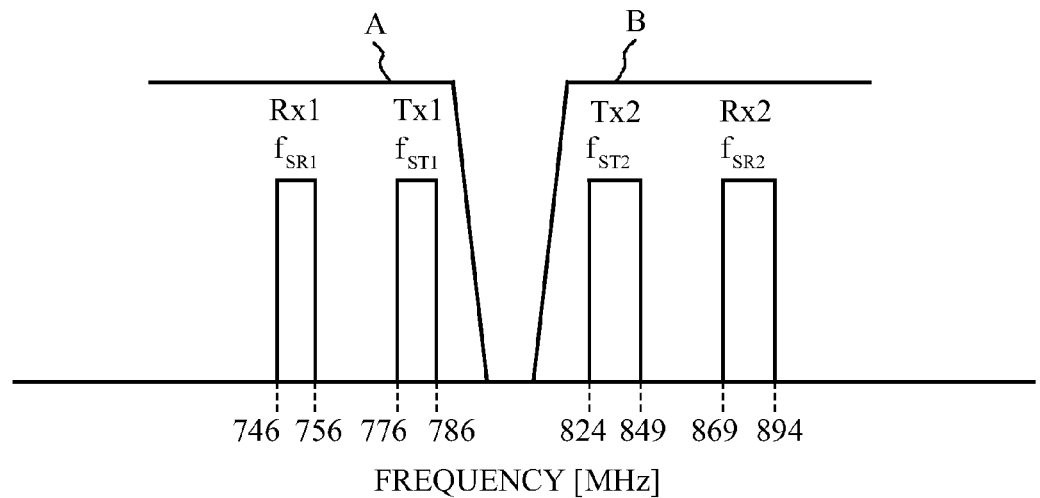
FIG. 2A is a schematic view illustrating passbands of a low-pass filter and a high-pass filter.

A description will now be given of the transmission and reception of signals with reference to FIG. 1 and FIG. 2A. A passband Tx1 of the transmission filter 132T includes the transmission band of LTE (Long Term Evolution) Band 13 (776 to 786 MHz). A passband Rx1 of the reception filter 132R includes the reception band of LTE Band 13 (746 to 756 MHz). A transmission/reception band (a first transmission/reception band) of the first transmitting/receiving circuit including the first front end 130 is the same as the transmission/reception band of LTE Band 13. A passband Tx2 of the transmission filter 142T includes the transmission band of W-CDMA (Wideband Code Division Multiple Access) Band 5 (824 to 849 MHz). A passband Rx2 of the reception filter 142R includes the reception band of W-CDMA Band 5 (869 to 894 MHz). A transmission/reception band (a second transmission/reception band) of the second transmitting/receiving circuit including the second front end 140 is the same as the transmission/reception band of W-CDMA Band 5. A frequency $f_{ST1}$ of the $S_{T1}$ is within the Tx1. A frequency $f_{ST2}$ of the $S_{T2}$ is within the Tx2. A frequency $f_{SR1}$ of the $S_{R1}$ is within the Rx1. A frequency $f_{SR2}$ of the $S_{R2}$ is within the Rx2. As described above, the electronic component 100r is for performing voice communication by W-CDMA Band 5 for example and performing data communication and the like by LTE Band 13 for example. A description will now be given of transmission characteristics of filters. FIG. 2A is a schematic view illustrating passbands of the LPF and the HPF.

A solid line to which the alphabet A is affixed in FIG. 2A represents transmission characteristics of the LPF 112. A solid line to which the alphabet B is affixed represents transmission characteristics of the HPF 114. The passband of the LPF 112 and the passband of the HPF 114 do not overlap. The passband of the LPF 112 includes the Rx1 and the Tx1. The passband of the HPF 114 includes the Rx2 and the Tx2.

A description will be given of the transmission. The $S_{T1}$ illustrated with arrows in FIG. 1 is input to the first circuit 110 via the first common terminal 150. The $S_{T1}$ is transmitted through the LPF 112. A part of the $S_{T1}$ is input to the antenna 116 via the third common terminal 154. Another part of the $S_{T1}$ arrives at the HPF 114.

The $S_{T1}$ that has arrived at the HPF 114 is reflected by the HPF 114. The $S_{T1}$' that is a part of the $S_{T1}$ that has arrived at the HPF 114 leaks from the HPF 114. The $S_{T1}$ that has been reflected in the HPF 114 is input to the antenna 116, and transmitted to the outside of the mobile phone through the antenna 116. The $S_{T1}$' that leaked is described later.

As with the $S_{T1}$, the $S_{T2}$ is transmitted through the HPF 114. A part of the $S_{T2}$ is input to the antenna 116 via the third common terminal 154. Another part of the $S_{T2}$ arrives at the LPF 112. Most of the $S_{T2}$ is transmitted to the outside of the mobile phone through the antenna 116. The $S_{T2}$' that is a part of the $S_{T2}$ leaks from the LPF 112. The transmission of the $S_{T1}$ and the transmission of the $S_{T2}$ are performed simultaneously.

Now a description will be given of the reception. The antenna 116 receives a signal from the outside of the mobile phone. The received signal is input to the first circuit 110 via the third common terminal 154. The signal having a low frequency is reflected by the HPF 114, and is transmitted through the LPF 112. The signal having a high frequency is reflected by the LPF 112, and is transmitted through the HPF 114. The signal that has been transmitted through the LPF 112 is the $S_{R1}$. The signal that has been transmitted through the HPF 114 is the $S_{R2}$.

The $S_{R1}$ is input to the first front end 130 via the first common terminal 150. As described previously, the $S_{R1}$ is reflected by the transmission filter 132T and is transmitted through the reception filter 132R. The $S_{R1}$ that has been transmitted through the reception filter 132R is input to the input terminal of the LNA 136 and is output from the output terminal. As with the $S_{R1}$, the $S_{R2}$ is input to the second front end 140 via the second common terminal 152 and is output from the output terminal of the LNA 146.

A description will now be given of the intermodulation distortion. As illustrated with the dashed line arrow in FIG. 1, the $S_{T1}'$, which is a part of the $S_{T1}$ that has arrived at the HPF 114, leaks from the HPF 114 and is transmitted through the second common terminal 152. The $S_{T1}'$ and the $S_{T2}$ are mixed in the second duplexer 142. At this time, due to the non-linearity of the second duplexer 142, the third-order intermodulation distortion (IMD3: Inter Modulation Distortion) occurs. When the frequency of the IMD3 overlaps with the $f_{SR2}$, the receiving sensitivity of the second transmitting/receiving circuit degrades.

As illustrated with outlined arrows with dashed line in FIG. 1, the $S_{T2}'$, which is a part of the $S_{T2}$ that has arrived at the LPF 112, leaks from the LPF 112 and is transmitted through the first common terminal 150. The $S_{T2}'$ and the $S_{T1}$ are mixed in the first duplexer 132, and the IMD3 occurs. When the frequency of the IMD3 overlaps with the $f_{SR1}$, the receiving sensitivity of the first transmitting/receiving circuit degrades.

Figure 2B:
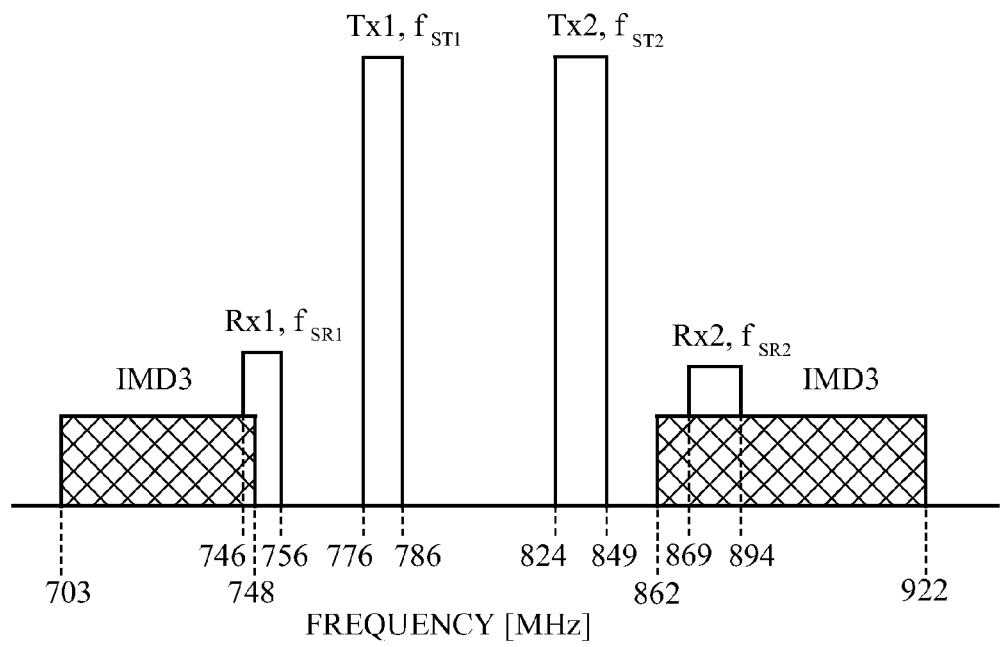
FIG. 2B is a schematic view illustrating a frequency band used in the electronic component in accordance with the comparative example.

A description will now be given of the transmission band, the reception band, and the frequency of the IMD3. FIG. 2B is a schematic view illustrating the frequency band used in the electronic component in accordance with the comparative example. A horizontal axis represents a frequency. A cross-hatched region denotes the IMD3.

In the frequency of the IMD3, especially $2f_{ST1}-f_{ST2}$ and $2f_{ST2}-f_{ST1}$ become a problem. In the example of FIG. 2B, these IMD3 occur in a band of 703 to 748 MHz and a band of 862 to 922 MHz. The IMD3 in a low frequency side overlaps with the Rx1 and the $f_{SR1}$. As a result, the receiving sensitivity of the first transmitting/receiving circuit degrades. In addition, the IMD3 in a high frequency side overlaps with the Rx2 and the $f_{SR2}$. As a result, the receiving sensitivity of the second transmitting/receiving circuit degrades. Especially, when both of or one of the first front end 130 and the second front end 140 performs the transmission and the reception simultaneously, the IMD3 and the reception signal are mixed, and the receiving sensitivity degrades. In addition, when the first front end 130 and the second front end 140 perform the transmission simultaneously, the IMD3 caused by the transmission signal tends to occur.

As described above, the IMD3 is caused by the $S_{T1}'$ and the $S_{T2}'$. Therefore, it is possible to suppress the IMD3 by reducing respective leakages of the $S_{T1}$ and the $S_{T2}$. To reduce the leakage, the isolation between the first front end 130 and the second front end 140 should be enhanced. However, as illustrated in FIG. 2, when frequencies of transmission bands are close to each other, it is difficult to enhance the isolation. It is possible to suppress the leakage of the $S_{T2}$ and enhance the isolation by increasing suppression characteristics of the LPF 112 for example. However, when suppression characteristics are increased, the loss of signal in the LPF 112 increases. As described, it is difficult to satisfy both of the isolation and good transmission characteristics.

In addition, in the electronic component 100r, two transmitting/receiving circuits share the single antenna 116. The shared use of the antenna contributes to the downsizing and cost reduction of the communication device. However, when the antenna is shared, there is a case where the $S_{T1}$ and the $S_{T2}$ are mixed in a state in which both of them have large electrical power. As a result, the amplitude of the IMD3 increases, and the receiving sensitivity greatly degrades. A description will now be given of a first embodiment.

First Embodiment

Figure 3:
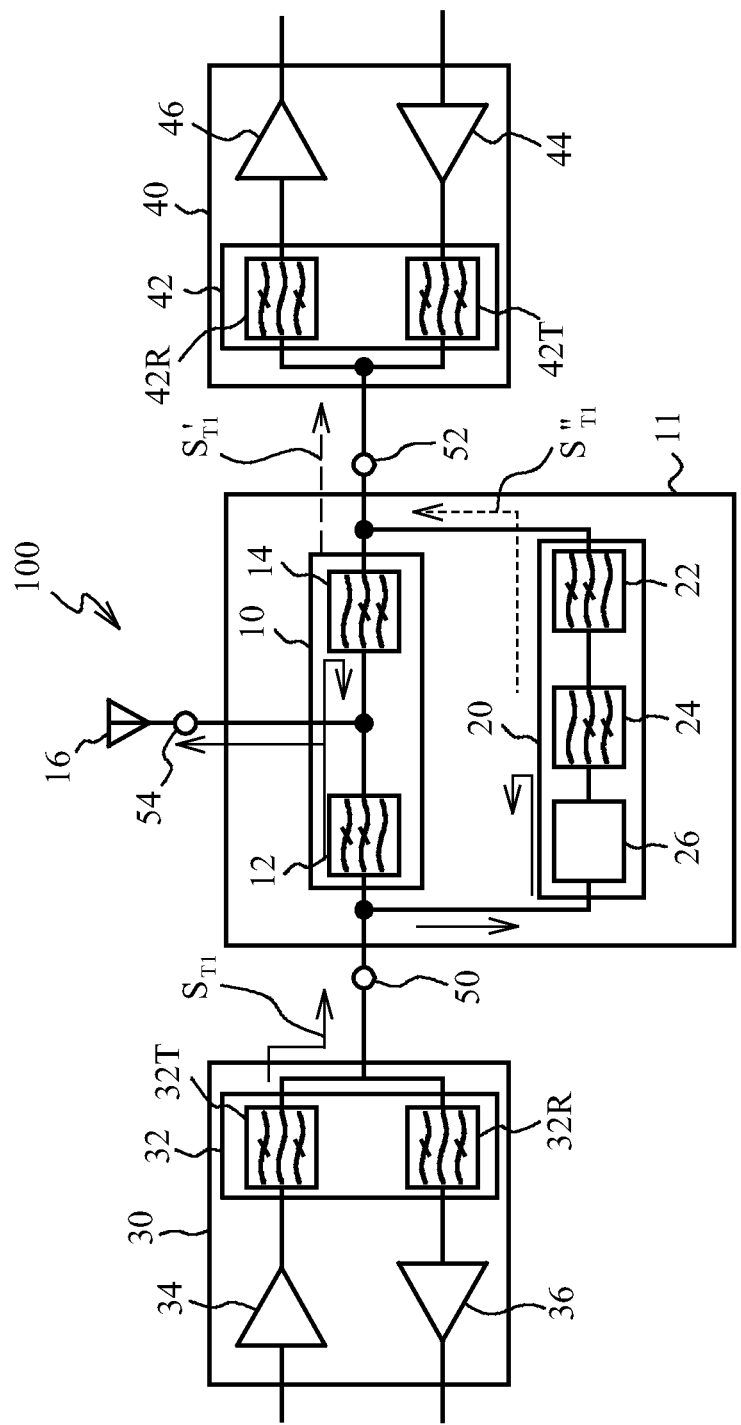
FIG. 3 is a diagram illustrating an electronic component in accordance with a first embodiment and a first transmission signal flowing through the electronic component.

A description will be given of a configuration of an electronic component in accordance with the first embodiment. FIG. 3 is a diagram illustrating the electronic component in accordance with the first embodiment and the first transmission signal flowing through the electronic component. A description of the configuration same as the one illustrated in FIG. 1 is omitted.

As illustrated in FIG. 3, an electronic component 100 in accordance with the first embodiment includes a diplexer 11, a first front end 30 and a second front end 40. The diplexer 11 includes a first circuit 10 and a second circuit 20. The second circuit 20 is connected in parallel to the first circuit 10 between a first common terminal 50 and a second common terminal 52. The second circuit 20 includes an LPF 22 (a first low-pass filter), an HPF 24 (a first high-pass filter), and a phase shift circuit 26. One end of the phase shift circuit 26 is connected to the first common terminal 50. The other end of the phase shift circuit 26 is connected to one end of the HPF 24. The other end of the HPF 24 is connected to one end of the LPF 22. The other end of the LPF 22 is connected to the second common terminal 52. The first front end 30 includes a first duplexer 32, a PA 34, and an LNA 36. The first duplexer 32 includes a transmission filter 32T and a reception filter 32R. The second front end 40 includes a second duplexer 42, a PA 44, and an LNA 46. The second duplexer 42 includes a transmission filter 42T and a reception filter 42R.

A description will now be given of the transmission of a signal in the first embodiment. A description will be given of the $S_{T1}$ in the first embodiment. The $S_{T1}$ illustrated with solid lines in FIG. 3 is input to the first circuit 10 and the second circuit 20 via the first common terminal 50. As described in FIG. 1, most of the $S_{T1}$ that has been input to the first circuit 10 is transmitted from an antenna 16. However, the $S_{T1}'$, which is a part of the $S_{T1}$, leaks from an HPF 14 (a second filter) and is output from the first circuit 10.

The phase of the $S_{T1}$ that has been input to the second circuit 20 is inverted by the phase shift circuit 26 of the second circuit 20. Most of the $S_{T1}$ is reflected by the HPF 24. The phase shift circuit 26 re-inverts the phase of the $S_{T1}$ that has been reflected. The $S_{T1}$ that has been reflected is transmitted through the antenna 16. A part of the $S_{T1}$ (hereinafter, described as $S_{T1}''$) is transmitted through the HPF 24. As illustrated with a dotted line arrow in FIG. 3, the $S_{T1}''$ is transmitted through the LPF 22. As described, the $S_{T1}''$ is output from the second circuit 20. As is the case with the leakage of the $S_{T1}'$ from the first circuit 10, the transmission of the $S_{T1}''$ through the second circuit 20 is caused by the transmission of the $S_{T1}$ through the HPF and the LPF. Therefore, the $S_{T1}''$ has an amplitude almost the same as the $S_{T1}'$. In addition, the $S_{T1}''$ has an opposite phase to the $S_{T1}'$. Thus, the $S_{T1}'$ and the $S_{T1}''$ merge and cancel each other out. Thus, the IMD3 caused by the $S_{T1}'$ and the $S_{T2}$ in the second duplexer 42 is suppressed.

Figure 4:
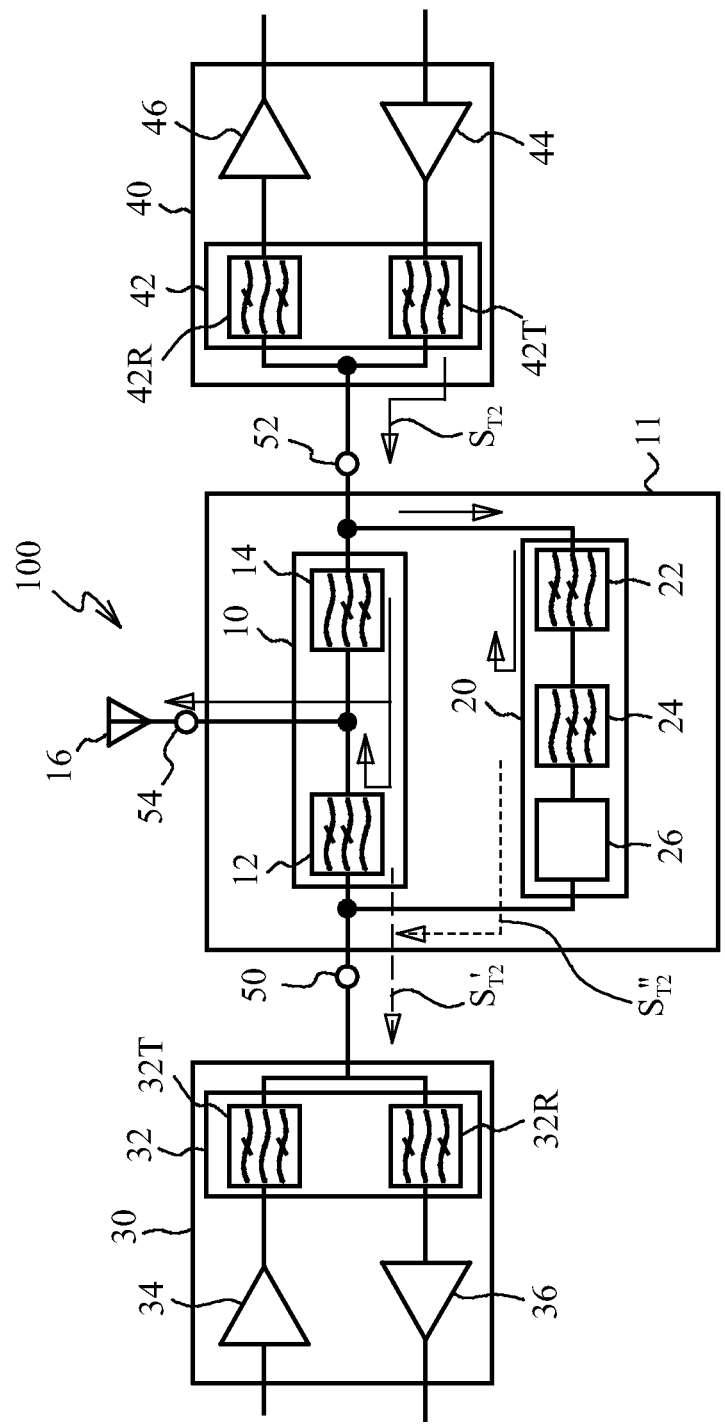
FIG. 4 is a diagram illustrating a second transmission signal flowing through the electronic component in accordance with the first embodiment.

A description will now be given of the transmission of the $S_{T2}$ in the first embodiment. FIG. 4 is a diagram illustrating a second transmission signal flowing through the electronic component in accordance with the first embodiment.

As illustrated with outlined arrows in FIG. 4, the $S_{T2}$ is input to the first circuit 10 and the second circuit 20 via the second common terminal 52. The phase of the $S_{T2}$ that has been input to the second circuit 20 is inverted by the phase shift circuit 26 of the second circuit 20. A part of the $S_{T2}$ (hereinafter, referred to as $S_{T2}''$) is transmitted through the LPF 22. As illustrated with an outlined arrow with dotted line in FIG. 4, the $S_{T2}''$ is transmitted through the HPF 24. As with the $S_{T1}'$ and the $S_{T1}''$, the $S_{T2}'$ and the $S_{T2}''$ merge and cancel each other out. Thus, the IMD3 caused by the $S_{T2}'$ and the $S_{T1}$ in the first duplexer 32 is suppressed.

A description will now be given of the reception of the signal in the first embodiment. A part of the $S_{R1}$ is input to the first front end 30 via the first common terminal 50. Another part of the $S_{R1}$ is input to the second circuit 20. The $S_{R1}$ that has been input to the second circuit 20 is transmitted through the phase shift circuit 26, but is reflected by the HPF 24 and is input to the first front end 30 via the phase shift circuit 26. In the same manner, the $S_{R2}$ is input to the second front end 40.

A description will now be given of a simulation of transmission characteristics of the electronic component in accordance with the first embodiment. In the simulation, transmission characteristics in respective equivalent circuits of the electronic component 100r in accordance with the comparative example and the electronic component 100 in accordance with the first embodiment are calculated.

Figure 5:
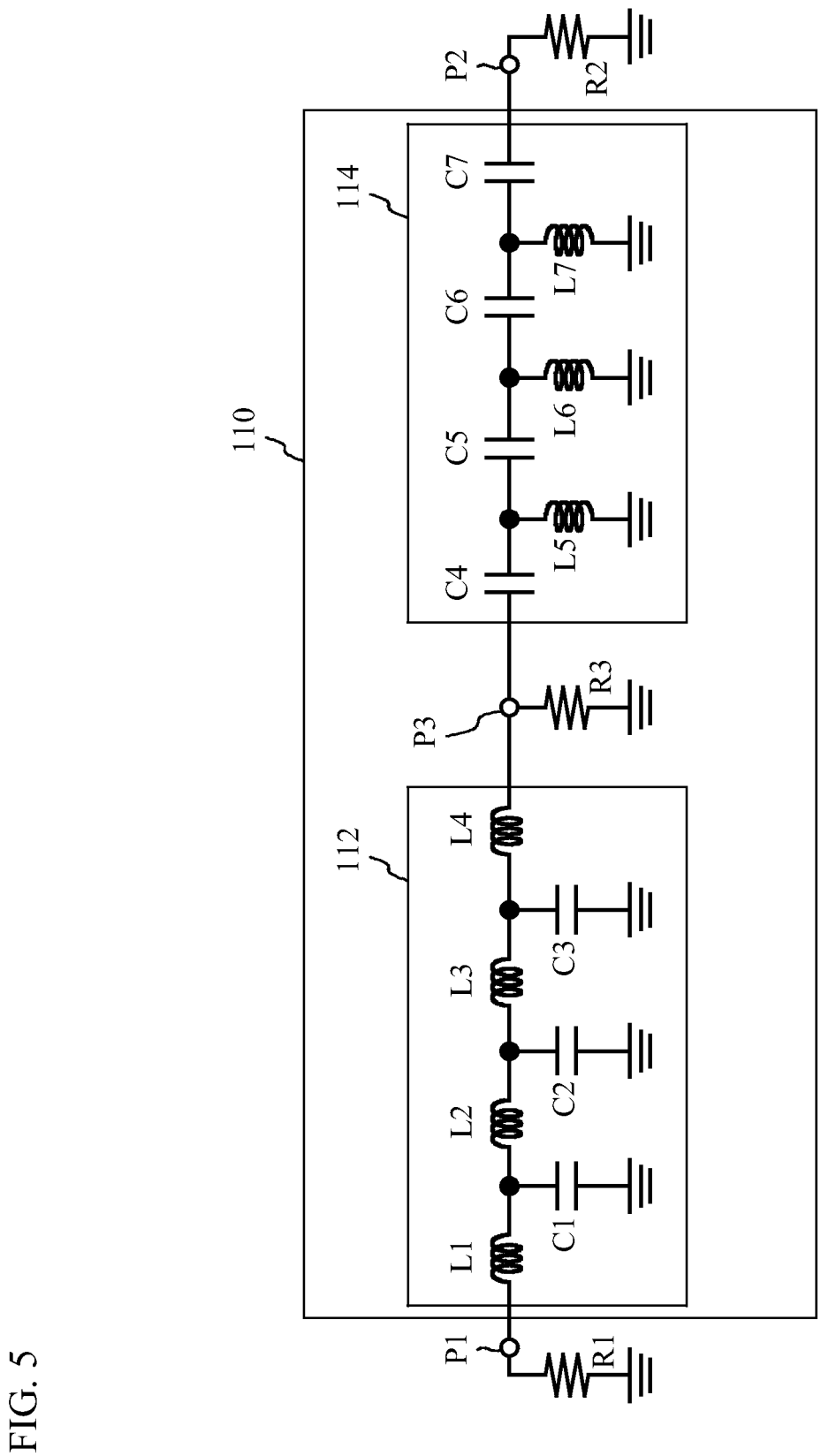
FIG. 5 is a circuit diagram illustrating an equivalent circuit of a diplexer included in the electronic component in accordance with the comparative example.

FIG. 5 is a circuit diagram illustrating an equivalent circuit of the electronic component in accordance with the comparative example. As illustrated in FIG. 5, the LPF 112 in the first circuit 110 of the electronic component 100r in accordance with the comparative example corresponds to an LC circuit including inductors L1 through L4, and capacitors C1 through C3. The inductor L1 is described as the L1. Other inductors and capacitors are described in the same manner. The HPF 114 corresponds to an LC circuit including an L5 through an L7, and a C4 through a C7. The first common terminal 150, the second common terminal 152, and the third common terminal 154 correspond to ports P1, P2 and P3 respectively.

One ends of an R1 and an R2 are connected to ground. The L1 through the L4 and the C4 through the C7 are connected in series between the other end of the R1 and the other end of the R2. The port P1 is located between the R1 and the L1, and the port P2 is located between the R2 and the C7. The C1 is connected between the L1 and the L2, the C2 is connected between the L2 and the L3, the C3 is connected between the L3 and the L4, an R3 is connected between the L4 and the C4, the L5 is connected between the C4 and the C5, the L6 is connected between the C5 and the C6, and the L7 is connected between the C6 and the C7. The C1 through the C3, the L5 through the L7, and the R2 through the R3 are connected to ground.

Figure 6:
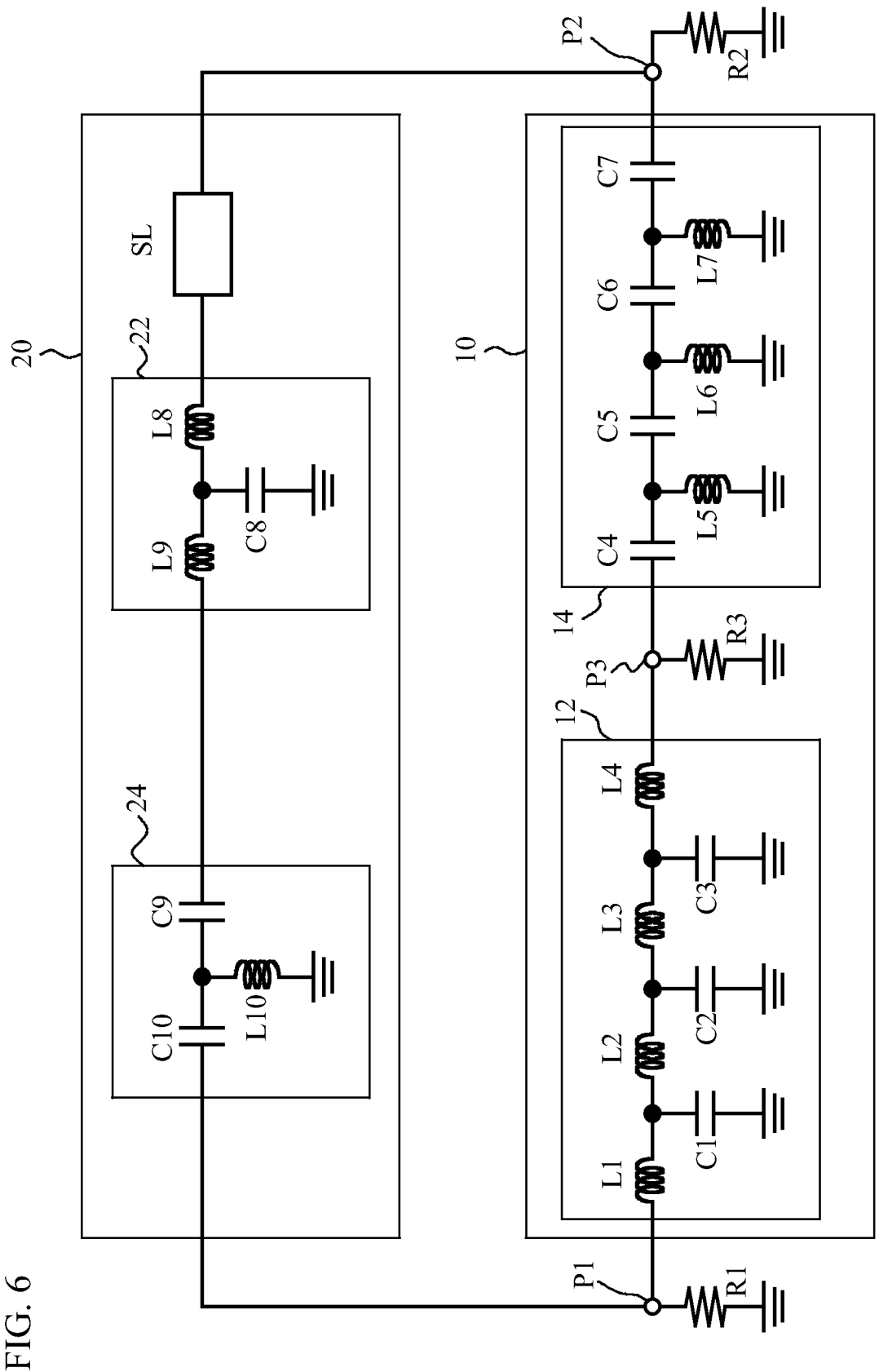
FIG. 6 is a circuit diagram illustrating an equivalent circuit of a diplexer included in the electronic component in accordance with the first embodiment.

FIG. 6 is a circuit diagram illustrating an equivalent circuit of the electronic component in accordance with the first embodiment. As illustrated in FIG. 6, the first circuit 10 of the electronic component 100 in accordance with the first embodiment has a same configuration as that of the first circuit 110 illustrated in FIG. 5. The first circuit 10 and the second circuit 20 are connected in parallel between one end of the resistor R1 and one end of the resistor R2.

The LPF 22 of the second circuit 20 corresponds to an LC circuit including an L8, an L9, and a C8. The HPF 24 corresponds to an LC circuit including an L10, a C9 and a C10. The phase shift circuit 26 corresponds to a strip line SL. The strip line SL, the L8, the L9, the C9 and the C10 are connected in series between the ports P1 and P2. The C8 is connected between the L8 and the L9, and the L10 is connected between the capacitors C9 and C10. The C8 and the L10 are connected to ground.

Isolation characteristics and transmission characteristics are examined by using equivalent circuits having the above described configuration. To examine isolation characteristics between the ports P1 and P2, the signal output from the port P2 in a case where the signal has been input to the port P1 is calculated. Transmission characteristics between the ports P1 and P2 correspond to transmission characteristics between the first common terminal 150 and the second common terminal 152 in FIG. 1 and transmission characteristics between the first common terminal 50 and the second common terminal 52 in FIG. 3.

In addition, to examine transmission characteristics between the ports P1 and P3, the signal output from the port P3 in a case where the signal has been input to the port P1 is calculated. The transmission characteristics between the ports P1 and P3 correspond to transmission characteristics between the first common terminal 150 and the third common terminal 154 in FIG. 1 and transmission characteristics between the first common terminal 50 and a third common terminal 54 in FIG. 3. To examine transmission characteristics between the ports P2 and P3, the signal output from the port P3 in a case where the signal has been input to the port P2 is calculated. The transmission characteristics between the ports P2 and P3 correspond to transmission characteristics between the second common terminal 152 and the third common terminal 154 in FIG. 1 and transmission characteristics between the second common terminal 52 and the third common terminal 54 in FIG. 3.

A description will be given of parameters used in the simulation. A description will be given of parameters in the comparative example first. The R1 through the R3 have a resistance value of 50Ω. Table 1 shows inductances and capacitances. For simplification, assume that components used in the simulation are ideal components that do not have a parasitic capacitance and a resistance component.

TABLE 1

| INDUCTOR | L1 | L2 | L3 | L4 | L5 | L6 | L7 |
|---|---|---|---|---|---|---|---|
| INDACTANCE [nH] | 21.8 | 31.2 | 31.2 | 24.1 | 8.73 | 8.27 | 8.73 |
| CAPACITOR | C1 | C2 | C3 | C4 | C5 | C6 | C7 |
| CAPACITANCE [pF] | 4.48 | 4.73 | 4.48 | 1.65 | 1.25 | 1.25 | 1.79 |

A description will now be given of parameters in the first embodiment. Resistance values of the R1 through the R3, inductances of the L2 through the L7, and capacitances of the C1 through the C6 are the same as respective ones in the comparative example. Table 2 shows inductances and capacitances in the first embodiment.

TABLE 2

| INDUCTOR | L1 | L8 | L9 | L10 |
|---|---|---|---|---|
| INDACTANCE [nH] | 23.6 | 35 | 14.8 | 5 |
| CAPACITOR | C7 | C8 | C9 | C10 |
| CAPACITANCE [pF] | 1.58 | 11.4 | 2.3 | 1.5 |

The strip line SL has a width of 0.03 mm, and a length of 55 mm.

Figure 7A:
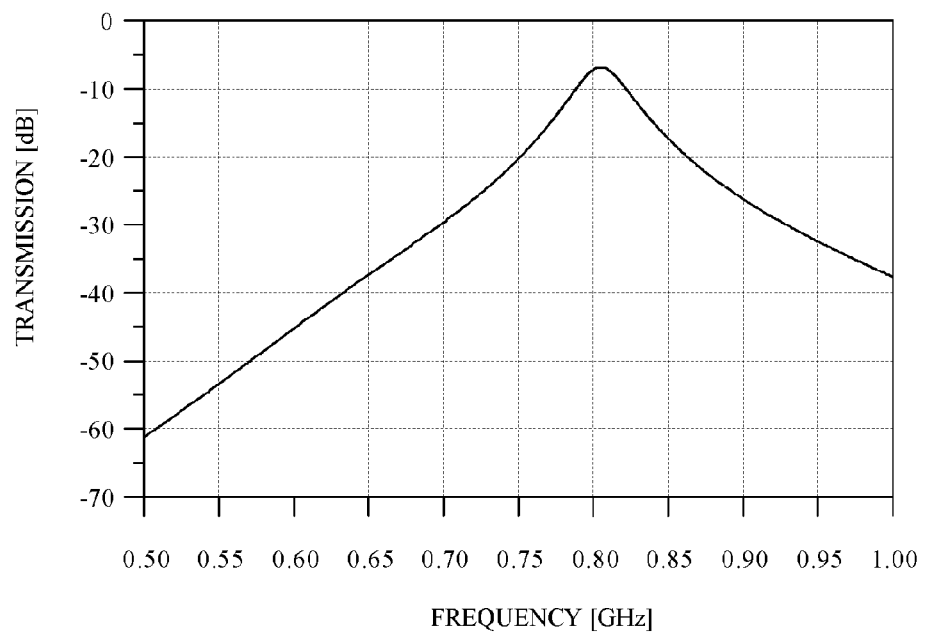
FIG. 7A depicts calculation results of transmission characteristics between ports P1 and P2 in the comparative example.
Figure 7B:
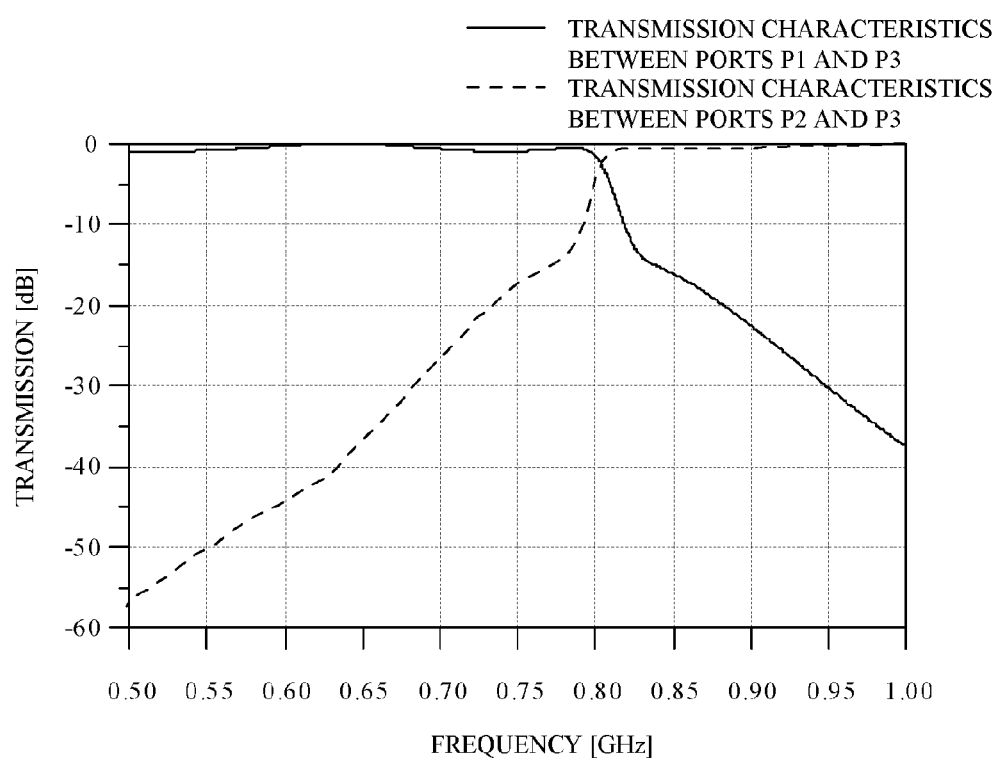
FIG. 7B depicts calculation results of transmission characteristics in the comparative example.

A description will be given of a simulation result in the comparative example. FIG. 7A depicts calculation results of transmission characteristics between the ports P1 and P2 in the comparative example. FIG. 7B depicts calculation results of transmission characteristics in the comparative example. In FIG. 7A and FIG. 7B, a horizontal axis represents a frequency, and a vertical axis represents the transmission of signal. As shown in FIG. 7A, in the first transmission/reception band, the transmission is equal to or smaller than approximately −10.4 dB. In the second transmission/reception band, the transmission is equal to or smaller than approximately −10.7 dB.

A solid line in FIG. 7B represents the transmission characteristics between the ports P1 and P3. A dashed line represents the transmission characteristics between the ports P2 and P3. A relation between the line type and the type of data is also applied to FIG. 8B, FIG. 12B and FIG. 14B described later. As illustrated with a solid line in FIG. 7B, the transmission between the ports P1 and P3 is equal to or greater than −0.942 dB in the first transmission/reception band, and is equal to or smaller than −12.5 dB in the second transmission/reception band in which the signal should be suppressed. As illustrated with a dashed line, the transmission between the ports P2 and P3 is equal to or greater than −0.821 dB in the second transmission/reception band, and is equal to or smaller than −12.0 dB in the first transmission/reception band in which the signal should be suppressed.

Figure 8A:
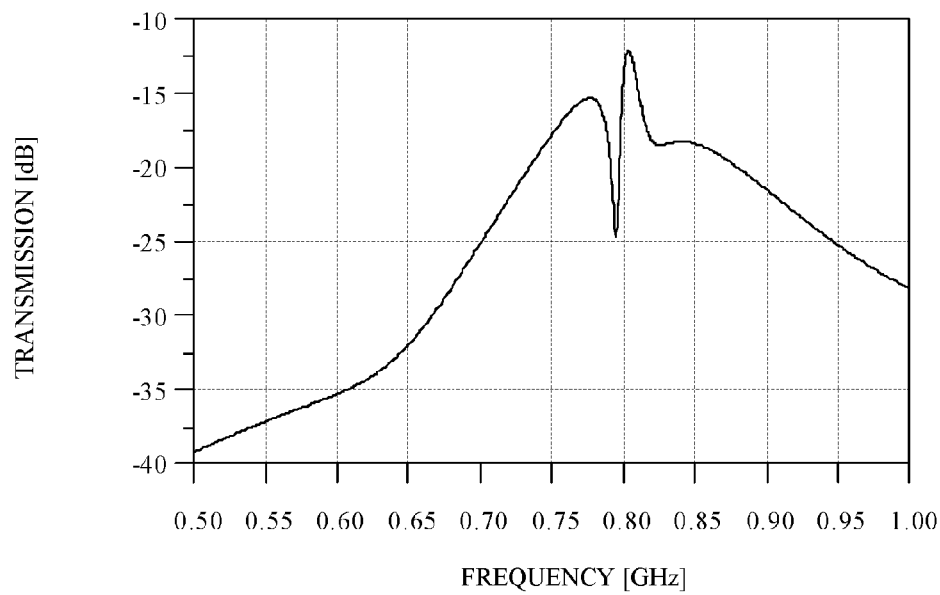
FIG. 8A depicts calculation results of transmission characteristics between the ports P1 and P2 in the first embodiment.
Figure 8B:
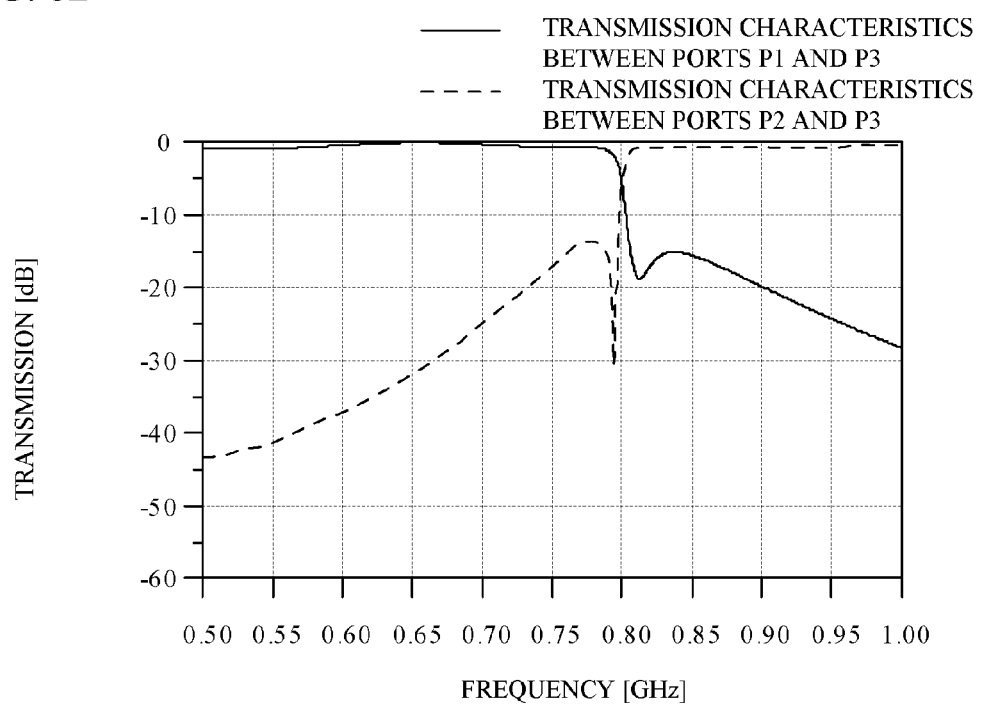
FIG. 8B depicts calculation results of transmission characteristics in the first embodiment.

A description will now be given of a simulation result in the first embodiment. FIG. 8A depicts calculation results of transmission characteristics between the ports P1 and P2 in the first embodiment. FIG. 8B depicts calculation results of transmission characteristics in the first embodiment.

As shown in FIG. 8A, in the first transmission/reception band, the transmission is equal to or smaller than −16.9 dB. Comparing FIG. 8A with FIG. 7A, it turns out that the first embodiment decreases the transmission between the ports P1 and P2; that is to say the isolation characteristics between the ports P1 and P2 are improved.

As illustrated with a solid line in FIG. 8B, the transmission between the ports P1 and P3 is equal to or greater than −0.907 dB in the first transmission/reception band, and is equal to or smaller than −16.2 dB in the second transmission/reception band in which the signal should be suppressed. As illustrated with a dashed line, the transmission between the ports P2 and P3 is equal to or greater than −0.738 dB in the second transmission/reception band, and is equal to or smaller than −14.4 dB in the first transmission/reception band in which the signal should be suppressed. Comparing transmission characteristics of FIG. 8B with that of FIG. 7B, it turns out that the first embodiment exhibits a loss approximately equal to that of the comparative example in the passband, and exhibits a suppression effect higher than that of the comparative example in the suppression band. As described above, according to the first embodiment, it is possible to satisfy both of good transmission characteristics and good isolation characteristics.

The second circuit 20 of the electronic component 100 in accordance with the first embodiment reflects the $S_{T1}$ and the $S_{T2}$, transmits the $S_{T1}''$ and the $S_{T2}''$ and inverts phases of the $S_{T1}''$ and the $S_{T2}''$. The $S_{T1}'$, which is a leak component unnecessary for communication, and the $S_{T1}''$, which is a component for a cancellation, cancel each other out, and the $S_{T2}'$ and the $S_{T2}''$ cancel each other out in the same manner. Thus, good isolation characteristics are ensured, and the IMD3 is suppressed.

To obtain good isolation characteristics, it is sufficient if the $S_{T1}'$ and the $S_{T1}''$ cancel each other out, and the $S_{T2}'$ and the $S_{T2}''$ cancel each other out. Thus, it is preferable that the $S_{T1}''$ has an amplitude as large as that of the $S_{T1}'$, and that the $S_{T1}''$ and the $S_{T1}'$ have a phase difference of 180°, for example. It is preferable that the $S_{T2}''$ has an amplitude as large as that of the $S_{T2}'$, and that the $S_{T2}''$ and the $S_{T2}'$ have a phase difference of 180°, for example. To make signals have the same amplitude, it is preferable that the loss of the $S_{T1}$ caused by the first circuit 10 and the antenna 16 is approximately equal to the loss of the $S_{T1}$ caused by the second circuit 20. In addition, it is preferable that the loss of the $S_{T2}$ caused by the first circuit 10 and the antenna 16 is approximately equal to the loss of the $S_{T2}$ caused by the second circuit 20. It is possible to adjust the loss of signal by adjusting respective transmission characteristics of the LPF 22 and the HPF 24. It is possible that signals having the same amplitude cancel each other out, or that signals having amplitudes slightly different from each other may cancel each other out. It is sufficient if the receiving sensitivity sufficient for the use of the mobile phone and the like is ensured as a result of mutual cancellation of signals.

To reduce the loss of signal, it is preferable that most of the $S_{T2}$ is reflected in an LPF 12 and the LPF 22, and most of the $S_{T1}$ is reflected in the HPF 14 and the HPF 24. It is preferable that the $S_{T2}''$ is smaller than the $S_{T2}$ input to the LPF 12 or the LPF 22 by equal to or more than 10 dB, equal to or more than 20 dB, or equal to or more than 30 dB. It is preferable that the $S_{T1}''$ is smaller than the $S_{T1}$ input to the HPF 14 or the HPF 24 by equal to or more than 10 dB, equal to or more than 20 dB, or equal to or more than 30 dB. To achieve above conditions, it is preferable that the LPF 12 and the LPF 22 have a high reflection coefficient at the $f_{ST2}$. It is preferable that the HPF 14 and the HPF 24 have a high reflection coefficient at the $f_{ST1}$.

The phase shift circuit 26 inverts the phase of signal by changing the phase of the $S_{T1}$ and the phase of the $S_{T2}$ by more than 90° and less than 270° for example. To obtain good isolation characteristics more effectively, it is preferable that the phase shift circuit 26 inverts the phase by more than 120° and less than 240°, or by more than 150° and less than 210°. It is sufficient if the receiving sensitivity sufficient for the use of the mobile phone and the like is ensured as a result of mutual cancellation of signals. Especially, when the phase is inverted by 180°, the receiving sensitivity is greatly improved. The phase shift circuit 26 is a strip line, an LC circuit, a transformer or the like for example, which inverts the phase of the signal. In addition, the alignment order of the LPF 22, the HPF 24, and the phase shift circuit 26 may be changed.

As illustrated in FIG. 6, the LPF 12 and the LPF 22, and the HPF 14 and the HPF 24 may be a filter composed of the LC circuit, or may be a dielectric filter or the like. In addition, filters included in the first circuit 10 and the second circuit 20 are not limited to an LPF or an HPF, and may be a BPF for example.

As illustrated in FIG. 2B, the first embodiment is an embodiment in which the electronic component 100 supports LTE Band 13 and W-CDMA Band 5. In this case, as the $f_{sT1}$ and the $f_{ST2}$ are adjacent, when transmissions of the $S_{T1}$ and the $S_{T2}$ are performed simultaneously, it is difficult to obtain sufficient isolation characteristics. According to the first embodiment, even in a case where transmissions are performed simultaneously, it is possible to obtain good isolation characteristics effectively. The electronic component 100 in accordance with the first embodiment may be used for communication devices having multi bands such as mobile phones including smart phones and tablet terminals. In addition, the communication method that the electronic component 100 supports is not limited to LTE Band 13 or W-CDMA Band 5.

A case where the receiving sensitivity degrades is not limited to the case where the IMD3 overlaps with both the $f_{SR1}$ and the $f_{SR2}$ as described in FIG. 2B. When at least one of the $f_{SR1}$ and the $f_{SR2}$ is higher or lower than the $f_{ST1}$ and the $f_{ST2}$, the degradation of the receiving sensitivity occurs. For example, there is a case where the $f_{SR2}$ is located between the $f_{ST1}$ and the $f_{ST2}$. At this time, the IMD3 overlaps with the $f_{SR1}$, and does not overlap with the $f_{SR2}$. In this case, the receiving sensitivity in the first transmitting/receiving circuit degrades. Since the first circuit 10 leaks the $S_{T2}'$ and the second circuit 20 transmits the $S_{T2}''$ and inverts the phase of the $S_{T2}''$, the $S_{T2}'$ and the $S_{T2}''$ cancel each other out. Accordingly, the IMD3 overlapping with the $f_{SR1}$ is suppressed. In addition, there is a case where the $f_{SR1}$ is located between the $f_{ST1}$ and the $f_{ST2}$, for example. At this time, the IMD3 overlaps with the $f_{SR2}$, and does not overlap with the $f_{SR1}$. In this case, the receiving sensitivity of the second transmitting/receiving circuit degrades. The first circuit 10 leaks the $S_{T1}'$ and the second circuit 20 transmits the $S_{T1}''$ and inverts the phase of the $S_{T1}''$. As the $S_{T1}'$ and the $S_{T1}''$ cancel each other out, the IMD3 overlapping with the $f_{SR2}$ is suppressed.

Especially, even in a case where outputs of the $S_{T1}$ and the $S_{T2}$ are performed simultaneously, the IMD3 tends to be generated in the first duplexer 132 and the second duplexer 142. According to the first embodiment, as the $S_{T1}'$ and the $S_{T1}''$ cancel each other out and the $S_{T2}'$ and the $S_{T2}''$ cancel each other out, it is possible to ensure good isolation characteristics effectively.

Figure 9:
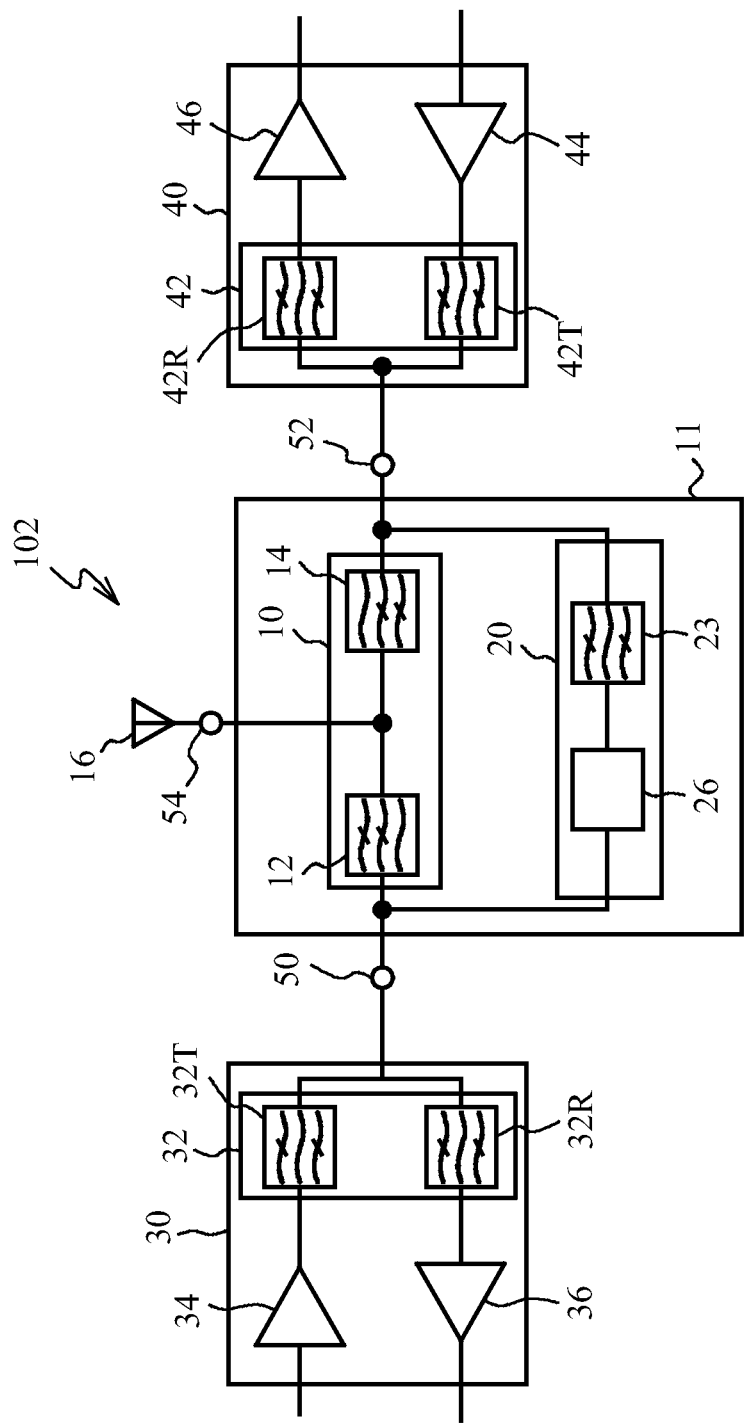
FIG. 9 is a diagram illustrating an electronic component in accordance with a modified embodiment of the first embodiment.

A description will now be given of a modified embodiment of the first embodiment. The modified embodiment of the first embodiment is an embodiment in which the LPF 22 and the HPF 24 included in the second circuit 20 is replaced with a BPF 23. FIG. 9 is a diagram illustrating an electronic component in accordance with the modified embodiment of the first embodiment.

As illustrated in FIG. 9, the second circuit 20 of an electronic component 102 in accordance with the modified embodiment of the first embodiment includes the BPF 23 and the phase shift circuit 26. The BPF 23 has a high reflection coefficient in transmission/reception bands (Tx1, Rx1, Tx2 and Rx2). Thus, the second circuit 20 reflects most of the $S_{T1}$ and most of the $S_{T2}$, and transmits the $S_{T1}''$ and the $S_{T2}''$. In addition, instead of the phase shift circuit 26, the BPF 23 may have a function of phase inversion.

Second Embodiment

Figure 10:
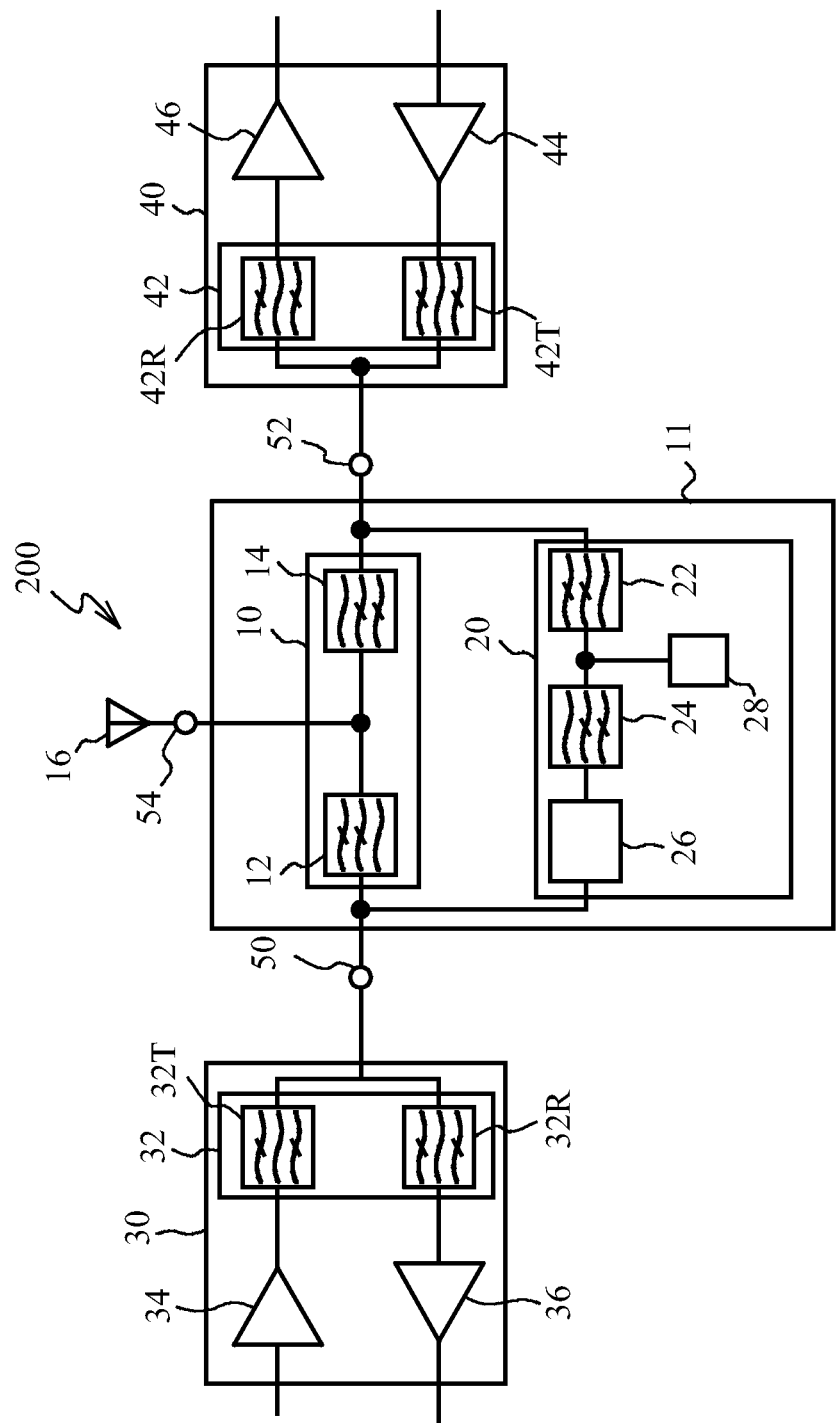
FIG. 10 is a diagram illustrating an electronic component in accordance with a second embodiment.

A second embodiment is an embodiment in which a load is added to the second circuit. FIG. 10 is a diagram illustrating an electronic component in accordance with the second embodiment. A description of configurations same as those already described in FIG. 1 and FIG. 3 is omitted.

As illustrated in FIG. 10, the HPF 24 in the second circuit 20 of an electronic component 200 in accordance with the second embodiment is connected between the first common terminal 50 and the LPF 22. The LPF 22 is connected between the second common terminal 52 and the HPF 24. An electronic load 28 is a resistor or the like for example, and is connected in parallel between the LPF 22 and the HPF 24. The LPF 22 has transmission characteristics same as that of the LPF 12. The HPF 24 has transmission characteristics same as that of the HPF 14. The impedance of the electronic load 28 is the same as the impedance of the antenna 16 for example. Thus, the first circuit 10 and the second circuit 20 have same transmission characteristics or mutually very close transmission characteristics.

Figure 11:
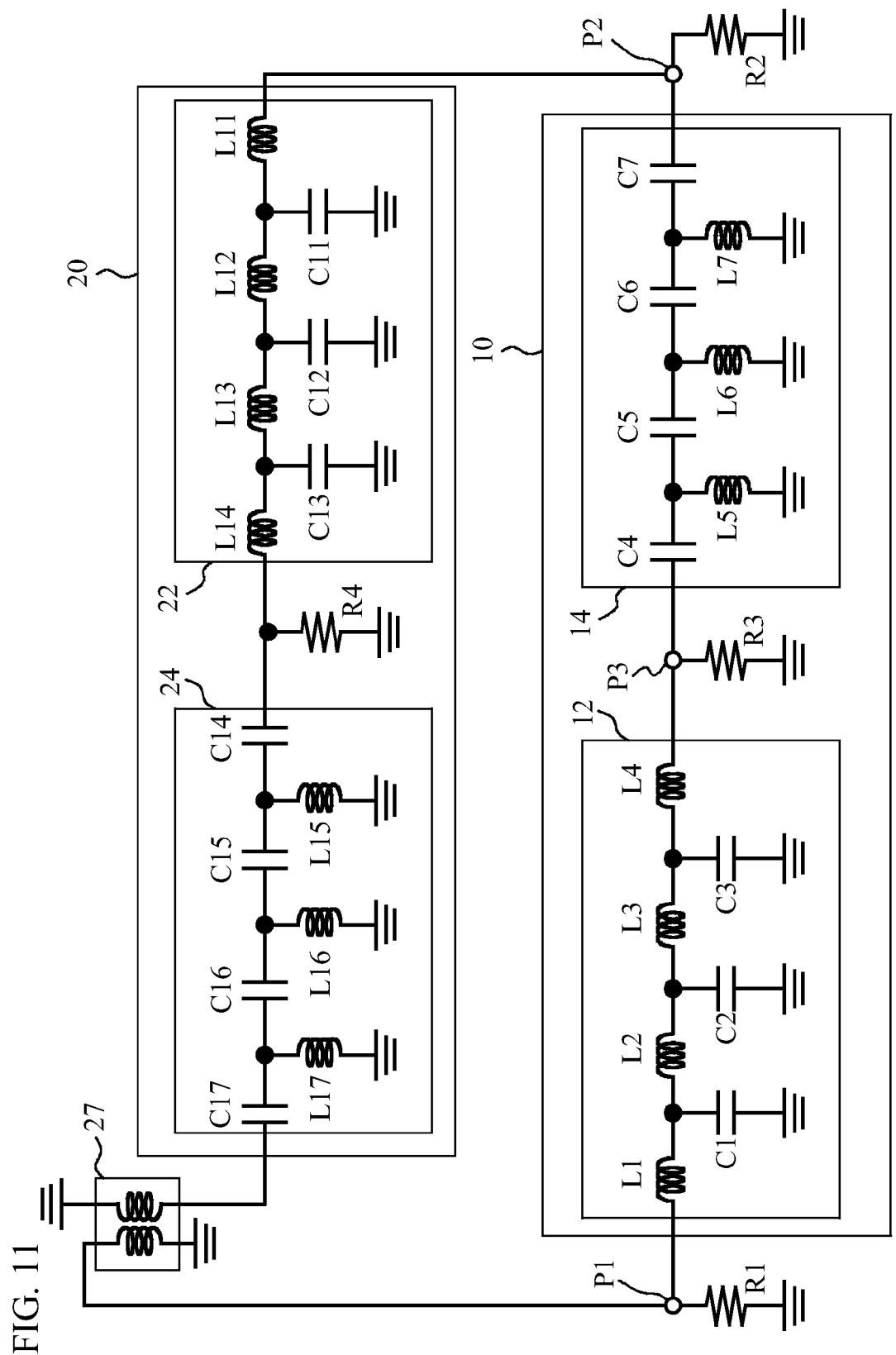
FIG. 11 is a circuit diagram illustrating an equivalent circuit of a diplexer included in the electronic component in accordance with the second embodiment.

A description will be given of simulations of isolation characteristics and transmission characteristics of the electronic component in accordance with the second embodiment. FIG. 11 is a circuit diagram illustrating an equivalent circuit of a diplexer included in the electronic component in accordance with the second embodiment. A description of configurations already described in FIG. 5 and FIG. 6 is omitted.

As illustrated in FIG. 11, the LPF 22 of the second circuit 20 corresponds to an LC circuit including an L11 through an L14 and a C11 through a C13. The HPF 24 corresponds to an LC circuit including an L15 through an L17 and a C14 through a C17. The phase shift circuit 26 corresponds to a transformer 27. The electronic load 28 corresponds to an R4.

The transformer 27, the L11 through the L14 and the C14 through the C17 are connected in series between ports P1 and P2. The C11 is connected between the L11 and the L12, the C12 is connected between the L12 and the L13, the C13 is connected between the L13 and the L14, and the R4 is connected between the L14 and the C14. The L15 is connected between the C14 and the C15, the L16 is connected between the C15 and the C16, and the L17 is connected between the C16 and the C17. The R3, the C11 through the C13, and the L15 through the L17 are connected to ground.

A description will be given of parameters used in the simulation. In regard to parameters in the simulation of the second embodiment, resistance values of the R1 through the R3, inductances of the L2 through the L7, and capacitances of the C1 through the C7 are the same as respective ones in the comparative example described in FIG. 5. Inductances of the L11 through the L14 are the same as inductances of the L1 through the L4 respectively. Capacitances of the C11 through the C13 are the same as capacitances of the C1 through the C3 respectively. Inductances of the L15 through the L17 are the same as inductances of the L5 through the L7 respectively. Capacitances of the C14 through the C17 are the same as capacitances of the C4 through the C7 respectively. The R3 has a resistance value of 50Ω. The transformer 27 has a conversion efficiency of 100%. That is to say, the loss of signal does not occur in the transformer 27.

Figure 12A:
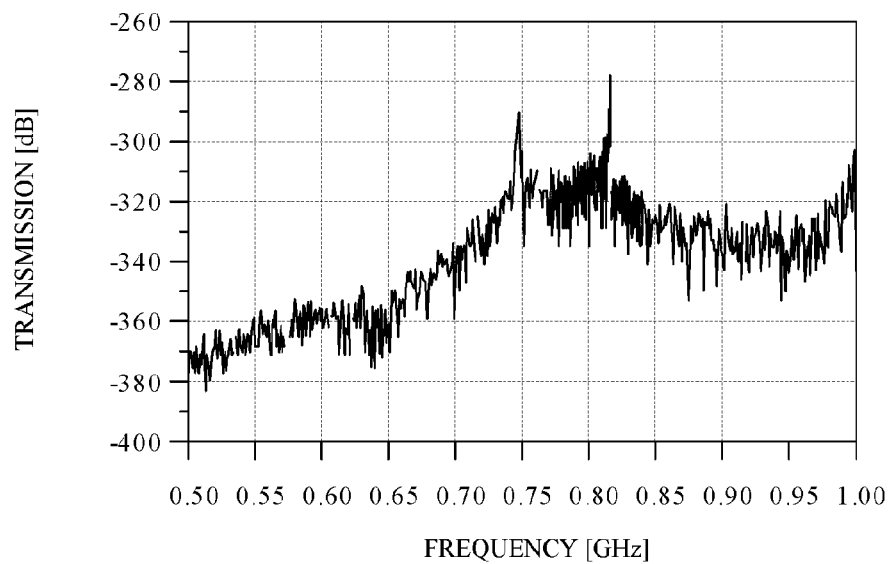
FIG. 12A depicts calculation results of transmission characteristics between the ports P1 and P2 in the second embodiment.
Figure 12B:
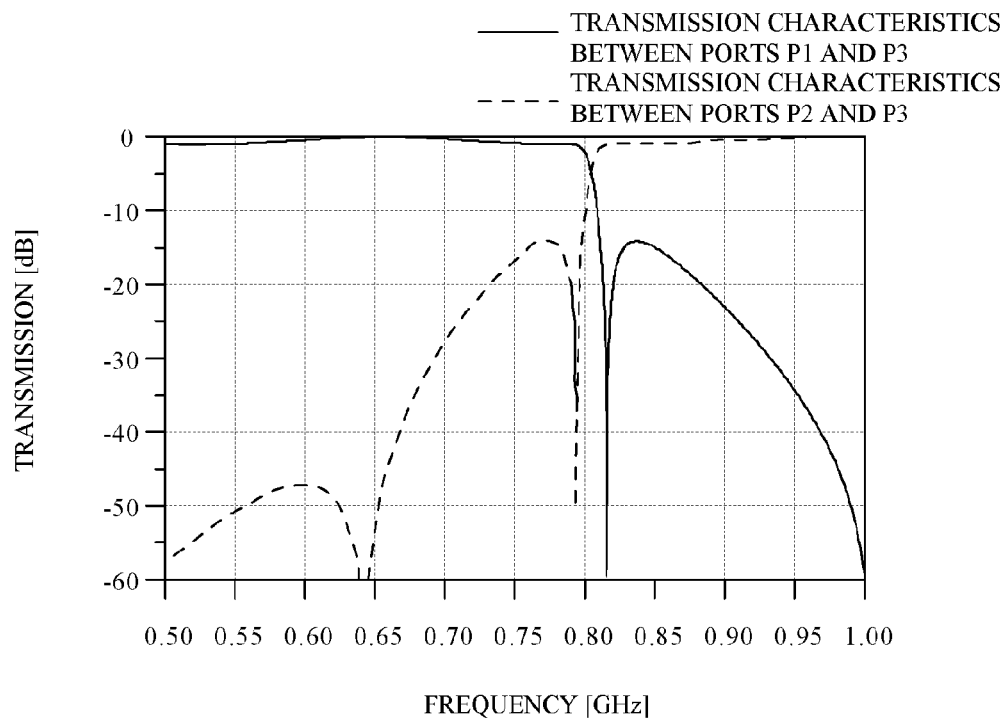
FIG. 12B depicts calculation results of transmission characteristics in the second embodiment.

FIG. 12A depicts calculation results of transmission characteristics between the ports P1 and P2 in the second embodiment. FIG. 12B depicts calculation results of transmission characteristics in the second embodiment.

As illustrated in FIG. 12A, in the first transmission/reception band, the transmission is equal to or smaller than −300 dB. Comparing FIG. 12A with FIG. 7A, it turns out that according to the second embodiment, the transmission in the first transmission/reception band and in the second transmission/reception band greatly decrease between the ports P1 and P2. That is to say, it turns out that the isolation characteristics the between ports P1 and P2 are greatly improved.

As illustrated with a solid line in FIG. 12B, the transmission between ports P1 and P3 is equal to or greater than −0.958 dB in the first transmission/reception band, and is equal to or smaller than −14.2 dB in the second transmission/reception band in which a signal should be suppressed. As illustrated with a dashed line, the transmission between the ports P2 and P3 is equal to or smaller than −0.864 dB in the second transmission/reception band, and is equal to and smaller than −13.9 dB in the first transmission/reception band in which a signal should be suppressed. Comparing the transmission characteristics in FIG. 12B with those in FIG. 7B and FIG. 8B, it turns out that the second embodiment exhibits a loss approximately equal to that of the comparative example in the passband, and exhibits a suppression effect higher than that of the comparative example in the suppression band. As described above, according to the second embodiment, it is possible to satisfy both of good transmission characteristics and good isolation characteristics.

According to the second embodiment, the second circuit 20 includes the electronic load 28. Accordingly, transmission characteristics of the second circuit 20 and transmission characteristics of the first circuit 10 connected to the antenna 16 are the same or almost the same. The $S_{T1}'$ output from the first circuit 10 and the $S_{T1}''$ output from the second circuit 20 have a same amplitude and a phase difference of 180°, for example. In addition, the $S_{T2}'$ output from the first circuit 10 and the $S_{T2}''$ output from the second circuit 20 have a same amplitude, and a phase difference of 180°, for example. As a result, even in a case where transmissions of the $S_{T1}$ and the $S_{T2}$ are performed simultaneously, it is possible to ensure good isolation characteristics and to suppress the IMD3 effectively.

Especially, it is preferable that the LPF 12 and the LPF 22 have same transmission characteristics, that the HPF 14 and the HPF 24 have same transmission characteristics, and that the loss of signal does not occur in the phase shift circuit 26. Accordingly, the first circuit 10 and the second circuit 20 have similar transmission characteristics. As a result, it is possible to ensure good isolation characteristics more effectively. It is possible that the LPF 12 and the LPF 22 have mutually very close transmission characteristics and that the HPF 14 and the HPF 24 have mutually very close transmission characteristics. In addition, the loss of signal in the phase shift circuit 26 may be very small.

A description will now be given of a modified embodiment of the second embodiment. The modified embodiment of the second embodiment is an embodiment in which a strip line is used as the phase shift circuit 26. As the configuration of the diplexer is the same as the one illustrated in FIG. 10, a description will be omitted.

Figure 13:
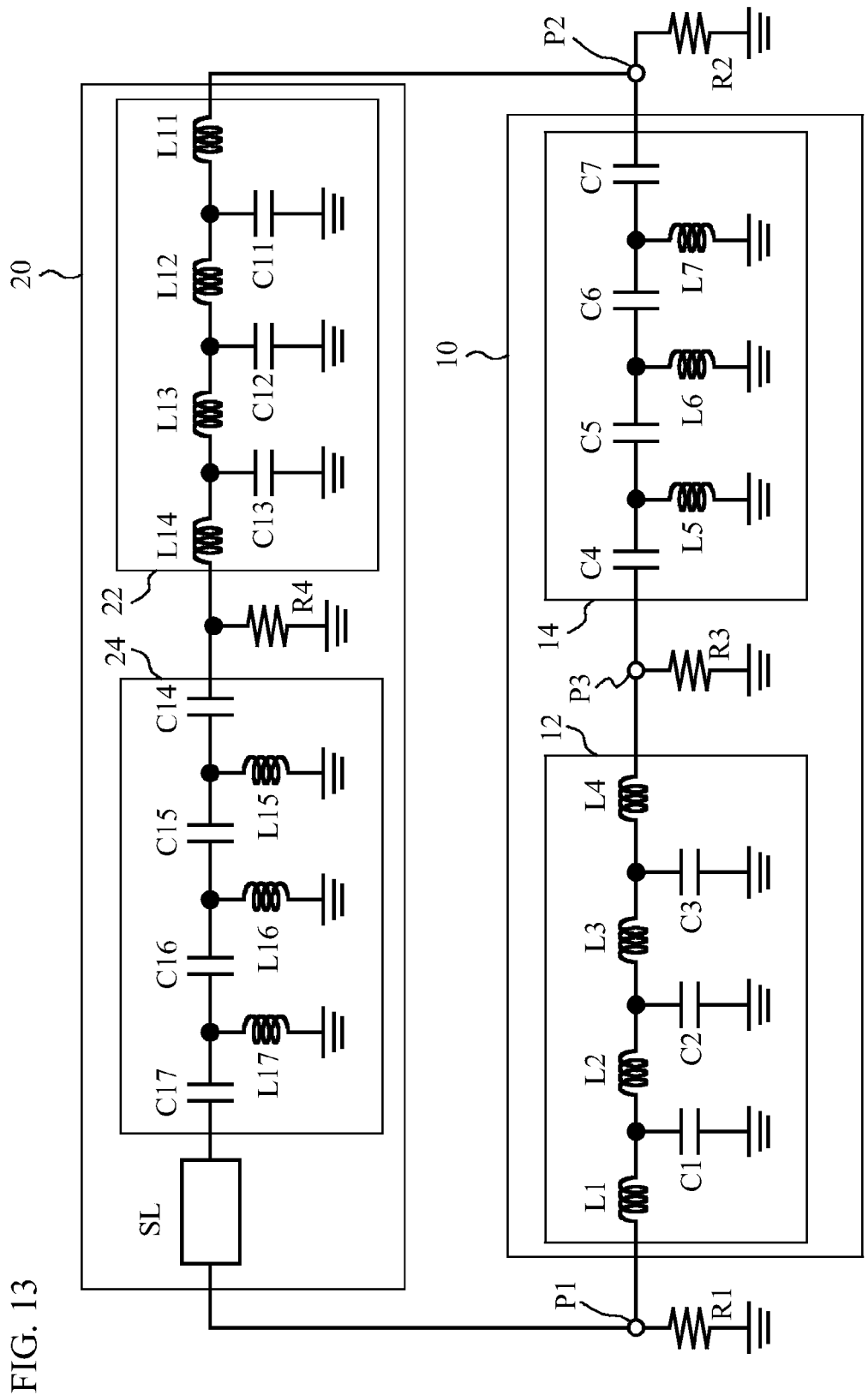
FIG. 13 is a circuit diagram illustrating an equivalent circuit of a diplexer included in an electronic component in accordance with a modified embodiment of the second embodiment.

FIG. 13 is a circuit diagram illustrating an equivalent circuit of a diplexer included in an electronic component in accordance with the modified embodiment of the second embodiment. As illustrated in FIG. 13, the phase shift circuit 26 corresponds to the strip line SL. One end of the strip line SL is connected in series to the other end of the C17. The other end of the strip line SL is connected to the port P1.

A description will now be given of parameters used in the simulation. Capacitances of the C1 through the C6 are the same as those described in the second embodiment. Inductances of the L2 through the L7 are the same as those described in the second embodiment. The C7 has a capacitance of 1.58 pF. The L1 has an inductance of 24.6 nH. Capacitances of the C11 through the C17 are the same as those of the C1 through the C7 respectively. Inductances of the L11 through the L17 are the same as those of the L1 through the L7 respectively.

Figure 14A:
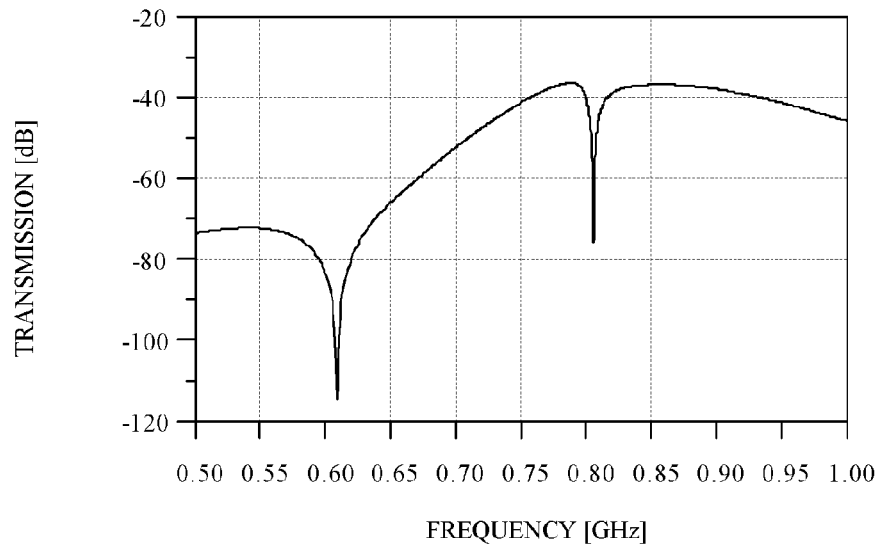
FIG. 14A depicts calculation results of transmission characteristics between the ports P1 and P2 in the modified embodiment of the second embodiment.
Figure 14B:
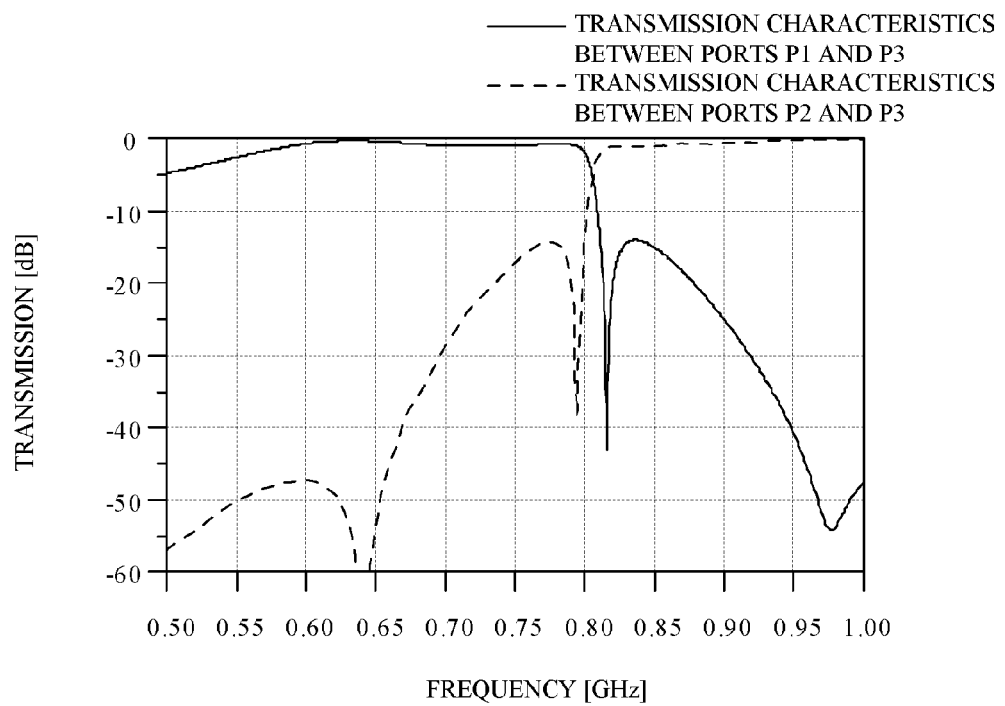
FIG. 14B depicts calculation results of transmission characteristics in the modified embodiment of the second embodiment.

A description will be given of a simulation result. FIG. 14A depicts calculation results of transmission characteristics between the ports P1 and P2 in the modified embodiment of the second embodiment. FIG. 14B depicts calculation results of transmission characteristics in the modified embodiment of the second embodiment.

As illustrated in FIG. 14A, in the first transmission/reception band, the transmission is equal to or smaller than −36.5 dB. In the second transmission/reception band, the transmission is equal to or smaller than −38.3 dB. Comparing FIG. 14A with FIG. 7A, it turns out that according to the modified embodiment of the second embodiment, isolation characteristics are improved.

As illustrated with a solid line in FIG. 14B, the transmission between the ports P1 and P3 is equal to or greater than −0.864 dB in the first transmission/reception band, and is equal to or smaller than −16.4 dB in the second transmission/ reception band in which a signal should be suppressed. As illustrated with a dashed line, the transmission between the ports P2 and P3 is equal to or greater than −0.864 dB in the second transmission/reception band, and is equal to or smaller than −16.7 dB in the first transmission/reception band in which a signal should be suppressed. Comparing the transmission characteristics of FIG. 14B with that of FIG. 7B, it turns out that the modified embodiment of the second embodiment exhibits a loss nearly equal to that of the comparative example in the passband, and exhibits a suppression effect higher than that of the comparative example in the suppression band. As described above, according to the modified embodiment of the second embodiment, it is possible to satisfy both of good transmission characteristics and good isolation characteristics.

As shown in FIG. 12A and FIG. 14A, comparing the second embodiment in which the transformer is used as the phase shift circuit 26 with the modified embodiment of the second embodiment in which the strip line is used as the phase shift circuit 26, the second embodiment exhibits better isolation characteristics. The transformer achieves the function of phase inversion in the wide frequency band compared to the strip line. Thus, the use of the transformer can obtain better isolation characteristics than the use of the strip line.

Although the embodiments of the present invention have been described in detail, it should be understood that the various change, substitutions, and alterations could be made hereto without departing from the spirit and scope of the invention.

What is claimed is:

1. An electronic component comprising:
a first circuit that is connected to a first common terminal for inputting and outputting a first signal set including a first transmission signal and a first reception signal having mutually different frequencies, a second common terminal for inputting and outputting a second signal set having a frequency higher than the first signal set and including a second transmission signal and a second reception signal having mutually different frequencies, and a third common terminal for being connected to an antenna; and
a second circuit that is connected in parallel to the first circuit between the first common terminal and the second common terminal, wherein
the first circuit includes a first filter that transmits the first signal set and reflects the second signal set, and a second filter that transmits the second signal set and reflects the first signal set, the first filter being connected between the first common terminal and the second filter, the second filter being connected between the first filter and the second common terminal, and the third common terminal being located between the first filter and the second filter, and
the second circuit includes a first high-pass filter that reflects the first transmission signal and transmits a part of the first transmission signal and the second transmission signal and a first low-pass filter that reflects the second transmission signal and transmits a part of the second transmission signal and the first transmission signal, and inverts a phase of the part of the first transmission signal and a phase of the part of the second transmission signal.

2. The electronic component according to claim 1, wherein a first duplexer that separates the first signal set into the first transmission signal and the first reception signal is connected to the first common terminal, and
a second duplexer that separates the second signal set into the second transmission signal and the second reception signal is connected to the second common terminal.

3. The electronic component according to claim 2, wherein an input of the first transmission signal to the first common terminal and an output of the first reception signal from the first common terminal are performed simultaneously, or an input of the second transmission signal to the second common terminal and an output of the second reception signal from the second common terminal are performed simultaneously.

4. The electronic component according to claim 1, wherein
the first transmission signal transmitted through the second circuit from the first common terminal to the second common terminal has a same amplitude as and an opposite phase to the first transmission signal transmitted through the first circuit from the first common terminal to the second common terminal, and
the second transmission signal transmitted through the second circuit from the second common terminal to the first common terminal has a same amplitude as and an opposite phase to the second transmission signal transmitted through the first circuit from the second common terminal to the first common terminal.

5. The electronic component according to claim 1, wherein
the first high-pass filter is connected between the first common terminal and the first low-pass filter,
the first low-pass filter is connected between the second common terminal and the first high-pass filter, and
the second circuit includes an electronic load that is connected in parallel between the first low-pass filter and the first high-pass filter.

6. The electronic component according to claim 5, wherein
the first filter is a second low-pass filter, and the second filter is a second high-pass filter,
the first low-pass filter and the second low-pass filter have same transmission characteristics, and
the first high-pass filter and the second high-pass filter have same transmission characteristics.

7. The electronic component according to claim 1, wherein
a frequency of at least one of the first reception signal and the second reception signal is higher or lower than a frequency of the first transmission signal and a frequency of the second transmission signal.

8. The electronic component according to claim 1, wherein
the first signal set includes a signal having a frequency in a transmission band of LTE Band 13 and a signal having a frequency in a reception band of LTE Band 13, and
the second signal set includes a signal having a frequency in a transmission band of W-CDMA Band 5 and a signal having a frequency in a reception band of W-CDMA Band 5.

9. The electronic component according to claim 1, further comprising:
a first transmitting/receiving circuit that is connected to the first common terminal and includes a duplexer separating the first signal set into the first transmission signal and the first reception signal; and
a second transmitting/receiving circuit that is connected to the second common terminal and includes a duplexer separating the second signal set into the second transmission signal and the second reception signal.

10. The electronic component according to claim 1, wherein
the second circuit includes a phase shift circuit that inverts the phase of the part of the first transmission signal and the phase of the part of the second transmission signal, the first high-pass filter, the first low-pass filter, and the phase shift circuit being connected in series.

11. An electronic component comprising:
a first circuit that is connected to a first common terminal for inputting and outputting a first signal set including a first transmission signal and a first reception signal having mutually different frequencies, a second common terminal for inputting and outputting a second signal set having a frequencies higher than the first signal set and including a second transmission signal and a second reception signal having mutually different frequencies, and a third common terminal for being connected to an antenna; and
a second circuit that is connected in parallel to the first circuit between the first common terminal and the second common terminal, wherein
the first circuit includes a first filter that transmits the first signal set and reflects the second signal set, and a second filter that transmits the second signal set and reflects the first signal set, the first filter being connected between the first common terminal and the second filter, the second filter being connected between the first filter and the second common terminal, and the third common terminal being located between the first filter and the second filter, and
the second circuit includes a band-pass filter that reflects the first transmission signal and the second transmission signal and transmits a part of the first transmission signal and a part of the second transmission signal, and inverts a phase of the part of the first transmission signal and a phase of the part of the second transmission signal.

12. The electronic component according to claim 11, wherein
the second circuit includes a phase shift circuit that inverts the phase of the part of the first transmission signal and the phase of the part of the second transmission signal, the band-pass filter and the phase shift circuit being connected in series.

* * * * *